United States Patent [19]

Emerson et al.

[11] 4,022,634
[45] May 10, 1977

[54] AMMONIA-CONTAINING SIZING COMPOSITIONS

[75] Inventors: Ralph Waldo Emerson, Boston, Mass.; John R. Shattuck, Cumberland Foreside, Maine

[73] Assignee: The Plasmine Corporation, Portland, Maine

[22] Filed: Mar. 31, 1975

[21] Appl. No.: 565,810

Related U.S. Application Data

[63] Continuation-in-part of Ser. No. 542,943, Jan. 22, 1975, abandoned, which is a continuation of Ser. No. 436,917, Jan. 28, 1974, abandoned.

[52] U.S. Cl. .............................. 106/218; 106/219; 106/236; 260/102
[51] Int. Cl.$^2$ ....................................... C08L 93/04
[58] Field of Search ........... 260/102; 106/218, 238, 106/219, 15 FP; 252/81

[56] References Cited

UNITED STATES PATENTS

| | | | |
|---|---|---|---|
| 2,192,488 | 3/1940 | Reilly | 162/180 |
| 2,288,060 | 6/1942 | Arleoter et al. | 106/238 |
| 2,331,925 | 10/1943 | Olson | 106/219 |
| 2,721,504 | 10/1955 | Yngve | 162/164 |
| 3,186,901 | 6/1965 | Peterson et al. | 162/180 |
| 3,804,788 | 4/1974 | Funaoka | 260/101 |

OTHER PUBLICATIONS

Chem. Abst. vol. 73:67837d.

Primary Examiner—Theodore Morris
Attorney, Agent, or Firm—Morton, Bernard, Brown, Roberts & Sutherland

[57] ABSTRACT

Novel sizing compositions comprising an aqueous mixture of ammonia, an ammonium salt, and a rosin that is modified with from about 5 to 50 percent based on the weight of the rosin, of an organic acidic compound selected from the group consisting of an α, β-unsaturated organic acid, an anhydride thereof, and their mixtures. In one embodiment, the ammonia and ammonium salt are produced as the reaction product of urea and an acid selected from the group consisting of sulfamic acid, phosphoric acid, oxalic acid, methanesulfonic acid, trichloracetic acid, nitric acid, sulfuric acid, hydrochloric acid, stearic acid, and acetic acid. The method of making the sizing compositions and paper which is sized with the sizing compositions are also provided.

59 Claims, No Drawings

AMMONIA-CONTAINING SIZING COMPOSITIONS

This is a continuation-in-part of application Ser. No. 542,943, filed Jan. 22, 1975, which in turn is a continuation of application Ser. No. 436,917, filed Jan. 28, 1974, both now abandoned.

This invention relates to novel sizing compositions containing ammonia, an ammonium salt and specially modified rosin, to methods for making the compositions, and to paper products sized with the compositions.

Cellulosic products — paper, rigid paper, paperboard, molded products, and the like — basically are produced by applying a dilute suspension or solution of fibers in an aqueous medium onto a fine mesh screen through which the aqueous medium drains, leaving a thin mat of fibers. The mat is removed from the screen, further liquid is expressed and the sheet is dried to form the desired product. The fibrous raw materials used in this process are generally one or more of the several types of commercially available pulp. These pulps include mechanical pulps, or groundwoods, bleached or unbleached, and chemical pulps, for example bleached, unbleached, and semi-bleached sulfate and sulfite pulps, as well as semi-chemical pulps. Other fibrous constituents used as the fibrous paper and paperboard-making raw materials include reclaimed waste papers, cotton fibers, inorganic and synthetic organic fibers, and mixtures of these materials.

The first step in paper product manufacture is pulp stock preparation. Pulps are most conveniently handled in the form of slurry to facilitate their mechanical treatment, non-fibrous additive mixing, and their delivery to the paper machine. Pulps are fed to the paper mill in a slurry directly from the pulping operation where both the pulping and paper-making are performed at the same location; otherwise, they are received as dry sheets or laps, and must be slushed before use. Slushing separates the fibers and disperses them in the aqueous medium with minimum detrimental mechanical effect so as to produce a consistently uniform starting material. The pulp slush or slurry is subjected to mechanical action known as beating or refining before being formed into a paper sheet. During refining, the fibers are swollen, cut, macerated, and frayed controllably to produce smaller fibrillar elements and to thereby desirably affect the physical properties of the resulting end product. Unbeaten pulp produces a light, fluffy, weak paper, whereas well-beaten pulp yields stronger, denser paper. During the beating or refining process, many non-fibrous materials are added to the pulp solution. Among these are mineral pigments for filling and loading, such as kaolin, titanium dioxide, calcium carbonate, and other well known filling materials, coloring additives and dyes, sizing agents, and other known beater additives.

After the pulp slurry has been beaten and refined and the additives mixed into it, this pulp slurry or furnish is delivered to continuous sheet forming equipment, such as a cylinder machine or a Fourdrinier, where it is discharged onto fine mesh screen through which the liquid carrier or aqueous medium drains and on which a fibrous mat is formed. This fibrous mat or sheet contains, for example, about 80% water when it leaves the screening and is therefore passed through one or more rotary presses for more water removal and is subsequently passed through a drying system, for example, steam-heated rotating cylinders, to yield the finished product. Molded pulp products are made on different equipment by a similar process designed to form, dry and press individual molded items such as paper plates and the like.

The sizing agents, as mentioned, are added to the papermaking process pulp slurry so as to render the finished product resistant to liquid penetration. In the alternative, the sizing agents may be excluded from the pulp additives, and may be applied to the paper after it is dried with very effective penetration resistance. In this method, the dry sheet is passed through a size solution or over a roll wetted with a size solution. Such sheets are tub sized or surface sized.

Among the materials currently used as sizing agents are rosin, various hydrocarbon and natural waxes, starches, glues, casein, asphalt emulsions, synthetic resins, and cellulose derivatives. Rosin is one of the most widely used and most effective sizing agents. Extracted rosin is often partially saponified with caustic soda, and processed to yield a thick paste of 70 to 80% solids, of which up to 30 to 40% is free unsaponified rosin. Dry rosin and completely saponified rosin are also used as sizing agents. Any of these rosins may further be modified, for example, by the addition of maleic anhydride or other supplement. At the paper mill, the rosin paste is dissolved or emulsified by diluting it to about 15% solids with hot water and then further diluting it with cold water under vigorous agitation to 5% solids or less. This solution or emulsion is either used for surface sizing or is added to the stock, for example 0.1 or 0.5 to 4.0% size based on dry fiber, usually before, but sometimes simultaneously with, for example, one to three times as much aluminum sulfate (papermakers alum). The aluminum sulfate is believed to form an ionically charged precipitant with the rosin size which is attracted to oppositely charged fiber.

It has now been discovered that novel sizing compositions can be produced which are more effective than the wellknown rosin types and are compatible with presently used pulp and stock material and additives. The novel sizing compositions contain a specially modified rosin, ammonia and an ammonium salt. Alternatively, the novel sizing compositions contain the reaction product of ammonia and a specially modified rosin. These sizing compositions exhibit superior sizing properties compared to conventional sizing agents when used in the same amount, and equivalent properties when used in lesser amounts, than the conventional sizing agents, thus enabling the user to meet existing standards with less sizing agent than heretofore required, and, therefore, at a lower cost. The products resulting from the use of the sizing compositions of this invention can be brighter and stronger than those produced by the heretofore available sizing agents. The novel sizing compositions also assist in the drying of the sheet when employed as a pulp additive so that the paper forming machine may be speeded up to produce a sheet of the same moisture content. Alternatively, more water may be added to the pulp stock to give the fiber on the paper machine wire a better orientation, thereby producing a stronger paper with superior formation. The novel sizing compositions are normally employed alone as a sizing agent with papermaker's alum in pulp stock or in surface sizing, but may be combined with commercially known sizing agents to replace a substantial part of those known agents.

The novel sizing compositions comprise an aqueous mixture of ammonia, an amonium salt, and a rosin that is modified with from about 5 to 50, preferably from about 9 or 10 to 20 or 30, percent, based on the weight of the rosin, of an organic acidic compound selected from the group consisting of an $\alpha$, $\beta$-unsaturated organic acid, an anhydride thereof, and their mixtures. The ammonia and ammonium salt can be employed per se to provide the compositions or components which provide them, e.g., in situ, can be used.

For instance, the ammonia and ammonium salt may be produced as the reaction product of urea and an acid and, optionally, additional ammonia or ammonium salt may be added to the urea-acid reaction product, ammonia may be reacted with salt-producing ingredients, e.g., acids, of the rosin to provide ammonium salt, or ammonium salt can be reacted with ammonia-producing ingredients of the rosin to provide ammonia.

One embodiment of the ammonia and ammonium salt components used in the novel sizing compositions (sizing agents) of this invention is described in co-pending application Ser. No. 545,537, filed Jan. 30, 1975 by the inventors of the present invention and that application is incorporated herein by reference. That application, in turn, is a continuation of application Ser. No. 358,296 filed May 8, 1973, also incorporated herein by reference. In these applications, a novel sizing agent is produced by reacting urea with sulfamic acid or phosphoric acid to produce a reaction product having a desired minimum total acidity, and the reaction product is further mixed with a carrier such as a known sizing agent, e.g., rosin, or other carrier described therein. While the sizing agents of application Ser. Nos. 358,296 and 545,537 exhibit considerably superior sizing properties over prior agents, it was discovered that the advantages of those agents containing reacted urea and rosin were further enhanced by including as a rosin therein a rosin which has been modified with at least about 5 percent, based on the weight of the rosin, of certain organic acid compounds, their anhydrides, and their mixtures. The advantages of so modifying rosin have been set forth in parent patent application Ser. Nos. 542,943, filed Jan. 22, 1975, and 436,917, filed Jan. 28, 1974. It has now also been discovered that, in addition to sulfamic acid and phosphoric acid, other acids such as oxalic acid, methane-sulfonic acid, trichloroacetic acid, nitric acid, sulfuric acid, hydrochloric acid, stearic acid and acetic acid, can be used to react with urea to produce the ammonia and ammonium salt used in the sizing agents of the present invention.

Generally, in the embodiment of the sizing compositions of the present invention wherein the urea-acid reaction product is used to provide ammonia and ammonium salt, the product is prepared in a multistep method in which a first component reaction product is formed by reacting urea and the acid, a second component soap is formed by modifying rosin with an organic acidic compound and either before, during, or after modification, is saponified, and a final product, the sizing composition, is formed by mixing the two components.

In forming the first component reaction product, the urea and a urea-reacting acid selected from the group consisting of sulfamic acid, phosphoric acid, oxalic acid, methane-sulfonic acid, trichloroacetic acid, nitric acid, sulfuric acid, hydrochloric acid, stearic acid and acetic acid, are mixed together and reacted. With the exception of nitric acid, sulfuric acid, hydrochloric acid, and acetic acid, each of these acids is normally a solid. Sulfamic acid is preferred. Water is preferably included in the mixture of urea and acid and is advantageously included in amounts, parts by weight, equal to the urea plus acid, although urea may be reacted with acid using water in excess of equal parts, or with little water, or without water when a solid acid or glacial acetic acid is used. Thus, the first component reaction product may be formed by reacting urea with solid or glacial acetic acid generally in the presence of from about 0 to about 90, preferably from about 40 to about 60, wt. percent water, based on the total weight of the urea, acid and water. When nitric acid, which at its highest concentration in the form of white fuming nitric acid contains more than 97.5 percent nitric acid, less than 2 percent water and less than 0.5 percent oxides of nitrogen, is used, the first component reaction product may generally be formed in the presence of about 1 to about 90, preferably from about 40 to about 60, percent water based on the total weight of the urea, nitric acid and water.

The urea is generally reacted with the acid at a temperature sufficient to cause a change in the pH of the mixture from an acidic pH to a basic pH as determined by a pH meter. This temperature will generally range from about 212° to about 425° F. and is dependent upon the water content of the mixture to some extent, and may generally be higher for mixtures containing a low water content. This temperature may also vary to some extent, depending upon the rate of reaction desired. Generally, the mixture boils at the temperature which changes the pH, and heating should preferably be maintained at boiling temperatures until boiling subsides, preferably stops, to maintain a pH above about 7 in the resulting mixture, although a urea-acetic acid mixture, however, does not achieve an alkaline pH, but remains at a pH of about 6.6 upon cessation of boiling. A 50 percent water/50 percent urea-acid, first component mixture can be used for guide purposes and in this case, generally, a temperature of about 212° to about 235° F. or higher, preferably about 215° to about 230° F., will increase the pH to above 7, e.g., to about 7.5 or 8.

Although the pH change is an important indication that the urea-acid reaction is complete, a more important consideration is the total acidity of the first component reaction product. This total acidity is measured as the amount of sodium hydroxide, expressed as the equivalent parts by weight of calcium carbonate, required to impart a pink color to a million parts of a phenolphthalein-containing, 50 weight percent, aqueous solution of the reaction product, and may be determined by use of the Hach Chemical Company Total Acidity Test (Hach Chemical Co., Ames, Iowa, Model AC-5 Acidity Test Kit). When the acid is reacted with the urea, ammonia and an ammonium salt are produced and this reaction not only raises the pH but also affects the total acidity of the mixture. Although it is not fully understood, this higher acidity (higher than pure urea) is believed to account for the ultimate superior sizing composition, i.e., agent, obtained. Thus, the amount of acid to urea is an important aspect, and is best defined in terms of the resulting total acidity (ppm) which it creates. The desired minimum total acidity is at least about 1,000 parts per million, and is preferably at least about 4,000 ppm. The actual amount of acid reacted with the urea is generally at least about 0.1 percent, and preferably from about 0.2 to about 8.0 percent, based on the weight of the urea, although more may be used, e.g., 15 or 20 percent acid based on the weight of the urea, to achieve the desired results. It has been found that a mixture containing 5 percent sulfamic acid, based on the weight of the urea, produces a reaction product having a total acidity in excess of 86,000 ppm, but a pH of between 7.9 and 8.3, when reacted in a 50 percent water, 50 percent urea-sulfamic acid mixture. (The total acidity is difficult to determine when it exceeds about 75,000 ppm or so, and for this reason, the total acidity of this particular reaction product was merely determined as being in excess of 86,000 ppm.) By way of comparison, the reaction product of 0.25 percent sulfamic acid with urea has a total acidity of 4,300 ppm.

Reaction of the urea with the acid is preferably, but not necessarily, conducted out of the presence of the rosin and the organic acidic compound. If desired, however, the urea can be reacted with the acid while in admixture with the modified rosin, as more fully discussed hereinafter.

Optionally, amounts of ammonia, up to about 6 percent by weight of the total mixture of ammonia, water and urea-acid reaction product may be added to the mixture of the urea-acid reaction product and water after it has cooled to room temperature to enhance the sizing results achieved upon combination with the specially modified rosin. For example, 20 parts of 29% aqueous ammonia are mixed at room temperature with 80 parts of the mixture of the urea-acid reaction product and water. This mixture is then combined with the modified rosin, as more fully discussed hereinafter.

Optionally, the mixture of the urea-acid reaction product and water may be added to a boiling mixture of a 50 weight percent solution of sodium borate in water, sulfamic acid, and ammonium sulfate to produce a clear mixture which, upon mixing while hot or after cooling with specially modified rosin, provides a sizing agent. The proportion of the urea-acid reaction product to ammonium sulfate may vary from about 2 to 1 to about 1 to 4. The amounts of sulfamic acid and sodium borate present in the boiling mixture are each at least about 4 percent based on the weight of the ammonium sulfate and the urea-acid reaction product.

In another embodiment, an ammonium salt is combined with urea and an acid selected from the group consisting of sulfamic acid, phosphoric acid, oxalic acid, methane-sulfonic acid, trichloroacetic acid, nitric acid, sulfuric acid, hydrochloric acid, stearic acid, and acetic acid to provide the ammonia and ammonium salt components of the sizing agent of the present invention. Thus, for example, dry powders of ammonium sulfate, urea, and sulfamic acid are heated together to about 330° F. at which temperature the mixture goes from an acid pH to an alkaline pH of about 8. The proportion of the urea to the ammonium salt may range from about 2 to 1 to about 1 to 4, and preferably is about 1 to 4. The amount of the acid is generally at least about 0.1 percent, and preferably from about 0.2 to about 8.0 percent, based on the weight of the urea, although more may be used, e.g., 15 or 20 percent acid based on the weight of the urea to achieve the desired results. This reaction product first component may then be combined with modified rosin in place of the urea-acid reaction product to yield a sizing agent.

The ammonium salt component of the sizing agent of the present invention may be the salt of any known ammonium salt-producing acid which reacts to produce an ammonium salt with ammonia, such as, for instance, sulfamic acid, phosphoric acid, oxalic acid, methane-sulfonic acid, trichloroacetic acid, nitric acid, hydrochloric acid, sulfuric acid, stearic acid and acetic acid. Preferably, ammonium sulfamate is used as the ammonium salt component of the sizing agent of the present invention. Solid ammonium salts may be used or alternatively the salt may be developed by reacting an aqueous solution of the desired acid with ammonia.

In forming the second component of the sizing compositions, the modified rosin, rosin is modified with an $\alpha,\beta$-unsaturated organic acid, e.g., an $\alpha,\beta$-unsaturated aliphatic acid generally containing from about 3 to 10, preferably from about 3 to 6, carbon atoms, or its anhydride, and mixtures thereof; as for example, e.g., acrylic acid and those preferred include maleic acid, maleic anhydride and fumaric acid.

Rosin is a mixture of resin acids (including abietic, pimaric, and levopimaric acids), hydrocarbons and high molecular weight alcohols, which is obtained from any of three sources. Gum rosin is the residue remaining after distillation of turpentine oil from crude turpentine oleoresin obtained from living pine trees, wood rosin is the residue remaining after distilling off volatile fractions of the solvent extraction product (usually using naphtha as the solvent) from pine stumps, and tall oil rosin is a by-product in the fractionation of tall oil (an oily mixture of rosin acids, fatty acids and neutral materials obtained from the acid treatment of spent black liquor from paper and pulping processes). All three types are very similar chemically, except that tall oil rosin often contains 1 to 5% fatty acids remaining after fractionation, whereas gum rosin and wood rosin do not. As mentioned above, rosin may be used in sizing agents in dry form, or may be partially or completely saponified. In the sizing compositions of the present invention, gum rosin, wood rosin, tall oil rosin, or their mixtures, may be used. Tall oil rosin is preferred, however, as it generally produces the best results, possibly due to the presence of the fatty acids in it, although this is not fully understood.

As mentioned, the organic acidic compounds which may be used in modifying the rosin are $\alpha,\beta$-unsaturated organic acids and anhydrides and their mixtures. Amounts of the organic acidic compound used to achieve the desired results generally range from about 5 to 50 percent or more, based on the weight of rosin, but preferably from about 9 to 30 percent is used, particularly about 15 percent. The modified rosin is formed into a soap by known methods, for example by adding sodium hydroxide or potassium hydroxide. However, the rosin may be saponified before, during, or after it is modified. Saponification need not be complete, but is preferably sufficient to render the final sizing composition water soluble. With respect to the embodiment of the present invention comprising the reaction product of ammonia and modified rosin, ammonia is preferably used as the sole saponifying base.

To form the second component of the sizing composition, the rosin may be first melted, e.g., in a jacketed kettle, which is preferably covered and agitated to speed up the melting process. When the rosin is in hot liquid form, the organic acidic compound, in an amount as described above, may then be stirred in gradually as the rosin continues to be heated at just below its boiling point. When the organic acidic compound is added, a reaction occurs which raises the temperature of the mixture. It is preferred that the rosin be melted before addition of the organic acidic compound in order to make certain that the materials are reacted uniformly. The temperature is then held at a point above 212° F., and may go as high as about 350° F. or about 425° F. or 550° F., for at least about 30 minutes, preferably from about 30 minutes to about 4 hours to complete the modification of the rosin. This produces a dark brown, clear, syrupy mixture which will solidify if permitted to cool. After the rosin has been modified, the hot mixture may be poured into an aqueous solution of a saponifying base, e.g., sodium hydroxide and/or potassium hydroxide, under slow agitation to saponify the rosin if it has not already been saponified or is only partially saponified. The solution of saponifying base may advantageously contain from about 5 to about 35 percent of the base, based on the weight of the water. In a preferred method of making the sizing compositions of this invention, a sufficient aqueous solution of saponifying base is used to produce an aqueous mixture of modified rosin soap containing from about 50 to about 70 weight percent solids, which mixture is preferably allowed to cool, and can be subsequently mixed with the ammonia and ammonium salt compound or with components which produce them. Alternatively, however, the saponifying base may be added to the rosin before it is modified, or even during modification, to effect saponification.

While the formation of this second component has been described in terms of reacting an anhydrous mixture of molten rosin and the organic acidic compound, the second component may alternatively be formed by first mixing rosin with water and then adding the organic acidic compound. Thus, in the method of making the sizing agent of this invention, the second component may be formed in the presence of from 0 to about 60 percent, preferably from 0 to about 10 percent, water, based on the total weight of the rosin, the organic acidic compound and the water.

In mixing the reacted-urea first component with the modified rosin soap second component to form an embodiment of the novel sizing compositions, sufficient amounts are used to provide sizing effective amounts, generally from about 25 to about 85 percent, based on the total dry weight of the sizing composition, of the first component and from about 75 to about 15 percent of the second component, in the sizing composition. This sizing composition generally contains at least about 25 weight percent, often about 40 to about 60 percent, water.

Preferably, this embodiment of the sizing compositions is formed by simply mixing the first component, and the second component at room temperature, but, less advantageously, they may be mixed and heated to the boiling point of the mixture to assure that all reactions are completed.

When the first component and the second component are mixed at an elevated temperature, the modified rosin may be heated to or kept at a temperature at which the mixing may be carried out. This mixing may comprise adding a diluted mixture of first component reaction product, which is heated, to the heated second component for chemical and physical mixing. The mixture of first and second components is heated at above 212° F. to boil off the water, and is preferably kept at the boil-off temperature until the cloudy solution becomes clear. Optionally, after the mixing is completed, very small amounts of ammonium hydroxide may be employed to adjust the pH of the product back to greater than 7 if it has dropped below 7. Amounts of ammonium hydroxide, up to 0.05 percent by weight of the mixture, will generally raise the pH to the desired range. The selection of first component and second component dilution concentrations is dependent on the desired relative amounts of reacted urea to modified rosin and on the desired concentration of the resulting sizing compositions. The choice of mixing temperatures employed is a function of workability and of the desired degree of chemical and physical mixing, although in this embodiment, temperatures of at least 80° F. may prevent precipitation on mixing.

In another method of mixing the first and second components of the sizing composition, the first component reaction product may be mixed with enough aqueous solution of saponifying base to achieve a pH of about 10 to 12, and the resulting mixture then added to a hot mixture of second component, a modified, unsaponified rosin, as described above, to perform the saponification and to produce the novel sizing composition. Alternatively, the reaction product-saponifying base-water mixture may be added to a modified, unsaponified rosin mixture which has been cooled to room temperature and diluted by the addition of water to produce the desired product.

In another method of mixing the first and second components, the rosin may be melted and mixed with the organic acidic compound as described under heat, and preferred proportions of urea and acid, or of urea, acid, and ammonium salt, added immediately after the rosin and organic acidic compound have melted together. This mixture is brought to the boiling point. The reaction of the urea and acid, or of urea, acid, and ammonium sulfate, described in the preferred process for the first component mixture occurs in the presence of the hot rosin-organic acidic compound mixture. Alternatively, a mixture of the urea and the acid, or of urea, acid, and ammonium sulfate, preferably premelted, is added to the hot reacted mixture of the rosin and the organic acidic compound. When the reaction is completed, the mixture is then saponified as previously described. Sizing results may be equally as good by following this procedure or that above in which the first and second components are formed separately, but this procedure is more difficult to control because the reactions proceed rapidly. It has been observed that when both components are formed in a single step, as here, the acid requirements in making the first component are somewhat reduced, although this is not completely understood.

If the sizing composition appears cloudy, it may be clarified by the addition of isopropanol or other clarification method used in the art, but is preferably clarified by the addition of ammonia which stabilizes the composition at low temperatures and enhances the properties of the sizing composition to achieve the desired clarification. For example, about 2% or less ammonia may be added to the composition, based on its total weight.

Ammonia, an ammonium salt, and the specially modified rosin or a soap or the specially modified rosin may be mixed at room temperature to yield a sizing agent. The soap of the specially modified rosin is prepared by pouring the hot mixture of the rosin and the organic acidic compound into an aqueous solution of a saponifying base, e.g., sodium hydroxide and/or potassium hydroxide, under slow agitation to saponify the modified rosin. Sufficient aqueous solution of the saponifying base is used to produce an aqueous mixture of modified rosin soap containing from about 50 to about 70 weight percent solids. Based on the total weight of the ammonia, the ammonium salt, and the rosin and the organic acidic compound on a dry basis, the sizing agent may be prepared with from about 3 percent to about 30 percent ammonia, from about 4 percent to about 72 percent ammonium salt and from about 93 to about 25 percent rosin and organic acidic compound, using the ratio of ammonium salt to ammonia is greater than about 1 to 1. The term "dry" is used throughout this specification to mean exclusive of any water which is present. Alternatively, ammonia may be produced in situ by reaction between the rosin, the organic acidic compound, and the ammonium salt by using from about 4 percent to about 75 percent ammonium salt and from about 96 percent to about 25 percent rosin and organic acidic compound based on the total weight of the ammonium salt and the rosin and organic acidic compound on a dry basis.

In a preferred embodiment, the ammonium salt in the sizing agent is produced in situ in the reaction of ammonia, rosin and organic acidic compounds. Ammonia may be combined with a soap of the specially modified rosin or preferably ammonia alone is used to saponify the rosin. It is believed that this reaction product is a mixture of the salts of ammonia with the resin acids in the rosin and of the organic acidic compounds used to modify the rosin. The sodium hydroxide, potassium hydroxide, or soda ash normally used to saponify rosin raises the pH to the alkaline pH of this invention but also reduces the total acidity below preferred levels unless the quantity used is closely controlled. When the specially modified rosin is saponified with ammonia and water alone, the product is a water soluble mix with the desired alkaline pH, generally a pH of about 9 or above.

Specially modified rosin must normally be melted to be saponified. When ammonia is used, however, the specially modified rosin will dissolve readily in water and ammonia at room temperature. In one method of saponification, the specially modified rosin is pulverized into water with high speed agitation. In a second method of saponification, water and ammonia are added under high speed agitation to melted specially modified rosin. It is preferred that aqueous ammonia be used, but alternatively ammonia gas may be bubbled through a melted specially modified rosin.

Although aqueous ammonia and specially modified rosin may be reacted at temperatures below boiling to produce good sizing results, it is preferred that these mixtures be boiled. Heating time can be controlled by measuring the pH of the mixture and, preferably, the mixture is agitated as it is heated. For example, a mixture boiled three minutes at a rapid boil reaches a pH of about 11.5 to about 11.7. If the rapid boiling is continued for an additional 2 to 3 minutes, the pH drops rapidly to the 9.4 to 9.6 range and the mixture loses its ammonia odor. Alternatively, a 20 to 30 minute slow simmer boil may be used to reduce the pH to the 8 to 9 range and the pH may then be raised to the preferred pH of about 9.2 to about 9.8, particularly 9.5, with sodium hydroxide or other alkaline material. After boiling, water is added to the mixture to replace the water and ammonia lost during boiling.

The amount of ammonia used depends upon whether or not ammonia is the sole saponifying agent used. When ammonia alone is used to saponify the specially modified rosin, about 10 percent to about 75 percent ammonia and from about 25 percent to about 90 percent rosin and organic acidic compound, based on the total weight of the ammonia and the rosin and organic acidic compound on a dry basis, are generally used to prepare the sizing agent. When ammonia is reacted with a soap of the specially modified rosin, the mixture is generally prepared with from about 4 percent to about 60 percent ammonia and from about 96 percent to about 40 percent rosin and organic acidic compound, based on the total weight of the ammonia and the rosin and organic acidic compound on a dry basis.

All of the above-described sizing agents have a pH generally in the range of about 6.6 to about 10 and a total acidity of at least 1000 parts per million. This total acidity is measured as the amount of sodium hydroxide, expressed as equivalent parts by weight of calcium carbonate, required to impart a pink color to a million parts of a phenolphthalein-containing sizing composition of the present invention, and may be determined by use of the Hach Chemical Company Total Acidity Test (Hach Chemical Co., Ames, Iowa, Model AC-5 Acidity Test Kit). The objective of each of the embodiments of the sizing agent of the present invention is to obtain the highest total acidity possible without lowering the pH to a level which makes the sizing agent insoluble in paper mill water. Thus, the proportions of the ingredients of the sizing compositions of the present invention vary in accordance with this objective and are thus conveniently defined in terms of the pH and total acidity they produce in the sizing agents.

The sizing composition may be employed as a pulp additive or as a surface sizing agent in the manufacture of cellulosive products. The exact amount to be used to produce optimum results will vary slightly, depending upon the type of pulp used and the desired proporties of the finished product. Amounts generally less than those currently used with known sizing agents may generally be used to produce equivalent or superior products. Thus for example, while known rosin sizing agents are generally used in amounts from about 0.1 or 0.5 up to about 4.0% of solids, based on the weight of fibers of the pulp slurry, the sizing compositions of this invention may be used in amounts as low as about 0.05% or 0.25%. Thus, from about 0.05 or 0.25 up to about 4% of our sizing compositions, by dry weight based on the weight of fibers in the pulp slurry, may be used. Typically, where 1% of known rosin sizing agent is normally used, 0.50% of the novel agent of this invention can be used to obtain equivalent or superior results.

The compositions, products and methods of this invention are further illustrated by the following examples.

EXAMPLE 1

The first component of this sizing agent is prepared as follows 4,000 grams of commercially available urea, 200 grams of sulfamic acid, and 4,200 grams of water are placed in a cooking vessel and heated with slow agitation and brought to a boil. When the temperature reaches about 218° F., boiling stops, water losses cease, and the pH of the solution, as determined by a pH meter, rises to about 8. The resulting product is a clear solution having a total acidity of 86,000 ppm, as determined with the Hach Chemical Company's Acidity Test Kit Model AC-5.

In forming the second component, 3360 grams of commercially available, pale, tall oil rosin, known as W-W Torex and sold by Reichhold Chemical Co., is melted in a cooking vessel. To this rosin is added 840 grams of hot, melted maleic anhydride, slowly, with agitation. The temperature of the resulting mixture is raised to a point just below that at which the mixture boils, and the mixture is cooked for 30 minutes. The cooked mixture is then added slowly under agitation to 4200 grams of water containing enough sodium hydroxide to bring the pH of the mix to about 10, in this case about 700 grams.

To form the sizing agent, 2000 grams of a diluted 50 weight percent water, 50 weight percent first component reaction product mixture is added to 2000 grams of the second component modified rosin soap at room temperature and mixed without heating to form a clear, dark-brown solution. This resulting final product is an excellent sizing agent containing equal parts by weight of solids of first and second components, and containing 50 percent by weight of water, useful in both pulp additive and surface size systems.

EXAMPLE 2

In this example, the first component reaction product and second component modified rosin soap are the same as in Example 1, but in mixing the two components, three times as much diluted first component is added to the second component. The resulting sizing agent contains 75 weight percent urea-sulfamic acid solids to 25 weight percent modified rosin solids and contains 50 percent water, by weight.

EXAMPLE 3

This example is similar to Example 1, except that the first component reaction product is made by mixing 4,000 grams of urea with only 10 grams of sulfamic acid and 4,010 grams of water. The resulting first stage solution has a pH of about 8.0 and an acidity of 4,300 ppm.

The second component and the mixing procedure and amounts of Example 1 are repeated, using this first component reaction product to yield an excellent sizing agent.

EXAMPLE 4

In this example, the first component reaction product and second component modified rosin soap are the same as in Example 3, but in mixing the two components, three times as much diluted first component reaction product is added to the second component modified rosin soap. The resulting sizing agent contains 75 percent urea-sulfamic acid solids to 25 percent modified rosin, by weight of solids.

EXAMPLE 5

The novel sizing agent of Example 1 is used as a pulp additive as follows 100 grams of dry fiber are placed in a beater with about 5,000 grams of water to produce a 2% fiber stock. This is beaten until the pulp is dispersed uniformly in the water. Next, 0.5 gram of the sizing agent of Example 1 is added while the solution is being beaten. After the sizing agent has been beaten into the stock, 1.25 grams off papermaker's alum is added and thoroughly mixed into the solution. The mix of fiber, sizing agent and alum is fed into a paper sheet former machine box and made into mat which is pressed and dried to produce a sized finished paper product. The sizing agents of Examples 2 to 4 are employed in a similar manner.

EXAMPLE 6

The sizing agent of Example 1 is fed into a roll box which is placed in line in a paper making process downline from the paper driers. Dried sheet is passed through rollers wetted with the sizing agent and roller pressure is adjusted so that there is a net paper weight increase after subsequent drying of about ½% based on the total weight of the dried paper. Likewise, sizing agents of Examples 2 to 4 may be similarly used.

To test the sizing agents of this invention, two samples of the product of Example 1 and a conventional rosin sizing agent known as Pexol 200 (produced by Hercules Powder Co.), are treated as follows The agents are mixed with papermaker's alum in bleached hardwood kraft to compare their performance. Handsheets are made using 5.7 grams of fiber diluted in water to a 1 weight percent solution. The fiber and water are blended in a Waring blender for about one minute and then the sizing agents are added and mixed for about 45 seconds and then the alum is added. These slurries are then further diluted with water to a fiber solids content of about 0.1%, based on the weight of the slurry. Sheets are then formed with a Williams Handsheet Former from slurries made with each of the sizing agents of the tested Examples. The sheets are placed between two blotters and then dried in a hot press having a temperature of about 230° F. and exerting a pressure of about 50 pounds per square inch. The sheets are then conditioned for 24 hours at 50% relative humidity and 72° F. and tested. The standard Tappi Ink Float Test is used to compare the sizing agents' performance. The results are set out in the following Table:

TABLE I

| Slurry Containing: | Ink Float Test (min.) | |
|---|---|---|
| (Wt. % solids based on fiber solids) | (weak side) | (Strong side) |
| a) 0.75% Example 1, 1½% Alum | 50 | 60 |
| b) 1.0% Example 1, 1½% Alum | 145 | 165 |
| c) 1.0% Pexol, 1½% Alum. | 35 | 45 |

EXAMPLES 7–11

In these Examples, a first component reaction product is prepared as in Example 1. The second component is, likewise, prepared as in Example 1, except that 168 grams, 437 grams, 535 grams, 672 grams, and 840 grams of maleic anhydride are added to 3360 grams of tall oil rosin in Examples 7 through 11, respectively, to constitute sizing compositions having 5, 13, 16, 20, and 25 percent by weight of maleic anhydride, based on the weight of the tall oil.

In mixing the two components, 23 parts by weight of second component modified tall oil rosin soap are added to 19 parts by weight of first component urea-sulfamic acid reaction product to produce novel sizing agents.

To test these sizing agents to determine the most desirable amount of maleic anhydride to tall oil rosin, the sizing agents of Examples 7 through 11 are mixed with a pulp slurry and then mixed with papermaker's alum and used to form test sheets. The test sheets are made from freshly prepared sizing agents and from two-week-old sizing agents, and are subjected to the TAPPI Hot Ink Floak Test using an ink having a pH of 2 at a temperature of about 100° F. The results are shown in Table II:

TABLE II

| Example | % maleic anhydride based on wt. of rosin | % Addition to Fiber | TAPPI Hot Ink Float Test (minutes) | | | |
|---|---|---|---|---|---|---|
| | | | Fresh Composition | | 2 Week-Old Composition | |
| | | | (Weak side) | (Strong side) | (Weak side) | (Strong side) |
| 7 | 5% | 1% + 1½Alum | 3 | 3½ | 2 | 3 |
| 8 | 13 | " | 19 | 23 | 6 | 6½ |
| 9 | 16 | " | 24 | 23 | 9½ | 11 |
| 10 | 20 | " | 28 | 38 | 5½ | 6 |
| 11 | 25 | " | 8 | 10 | 6½ | 7½ |

Table II shows that the preferred amount of maleic anhydride to rosin is greater than 5 percent by weight based on the weight of the rosin, and is most advantageously about 15 or 16 percent by weight based on the weight of the rosin.

EXAMPLES 12-14

In these Examples, the sizing agents are prepared as in Example 1, except that in the second component in Example 12, 535 grams of maleic anhydride are used, in Example 13, 535 grams of fumaric acid are used, and in Example 14, a mixture of 107 grams of maleic anhydride and 428 grams of fumaric acid are used. In mixing the two components, 23 parts by weight of second component are mixed with 19 parts by weight of first component.

TAPPI Hot Ink Float Tests are performed to compare the results of substitution of fumaric acid for maleic anhydride. The tests performed are shown in Table III:

TABLE III

| Example | % Addition To Fiber | TAPPI Hot Ink Test (minutes) | |
|---|---|---|---|
| | | (Weak side) | (Strong side) |
| 12 | 1% + 1½% Alum | 20 | 21 |
| 13 | " | 20 | 22 |
| 12 | ¾% + 1¼% Alum | 9 | 10 |
| 13 | " | 4½ | 5½ |
| 14 | " | 15 | 15 |

As illustrated by Table III, the sizing agent containing both maleic anhydride and fumaric acid produces better results than does the sizing agent with only maleic anhydride, and much better results than does the sizing agent containing only fumaric acid, although all perform well.

EXAMPLE 15

The sizing agent is prepared as in Example 1, except phosphoric acid is used instead of sulfamic acid.

EXAMPLE 16

The sizing agent is prepared as in Example 1, except maleic acid is used instead of maleic anhydride.

EXAMPLES 17-20

The sizing agent is prepared as in Example 1, except that in Example 17 oxalic acid, in Example 18 methanee-sulfonic acid, in Example 19 trichloroacetic acid and in Example 20 stearic acid is used instead of sulfamic acid, and in Example 20A, acrylic acid is used instead of maleic anhydride.

EXAMPLE 21

This example is similar to Example 1, except that the first component reaction product is made by mixing 4000 grams of urea with 200 grams of glacial acetic acid and 4,200 grams of water.

The second component and the mixing procedure of Example 1 are repeated, using this first component reaction product to yield a sizing agent.

EXAMPLE 22

In this example, the ammonia and ammonium salt components are made as follows: 111 grams of urea, 6 grams of sulfamic acid and 400 grams of ammonium sulfate are placed in a cooking vessel and are heated together to melt the mixture. At a temperature of about 330° F., the pH of the mixture goes from an acid pH to an alkaline pH of about 8.

To form the sizing agent, 19 parts by weight of the ammonia and ammonium salt components mixture are added to 23 parts by weight of the modified rosin soap of Example 1 at room temperature and mixed without heating.

EXAMPLE 23

In this example, the ammonia and ammonium salt components are made as follows 400 grams of ammonium sulfate, 20 grams of sulfamic acid and a solution of 50 grams of sodium borate in 50 grams of water are placed in a cooking vessel and brought to a boil to dissolve the solid sulfamic acid and ammonium sulfate. 117 grams of a solution of the reaction product of 111 grams of urea and 6 grams of sulfamic acid, prepared as in Example 1, in 117 grams of water are added to the boiling mixture.

To form the sizing agent, 19 parts by weight of the ammonia and ammonium salt components mixture are added to 23 parts by weight of the modified rosin soap of Example 1 at room temperature and mixed without heating to produce a clear mixture and yield a sizing agent.

EXAMPLE 24

The ammonia and ammonium salt components of this sizing agent are prepared as follows 30 grams of commercially available 29 weight percent aqueous ammonia, 24 grams of ammonium sulfamate and 68 grams of water are mixed at room temperature.

To form the sizing agent, 19 parts by weight of the ammonia and ammonium salt mixture are added to 23 parts by weight of the fumaric acid-modified tall oil rosin soap of Example 13 and mixed at room temperature to yield a sizing agent.

EXAMPLE 25

This example is similar to Example 24, except that the ammonia and ammonium salt component are made by mixing 20 grams of 29% ammonia, 16 grams of ammonium sulfamate, and 68 grams of water.

The modified rosin soap component and the mixing procedure and amounts of Example 24 are repeated using this first component to yield a sizing agent.

EXAMPLE 26

This example is similar to Example 24, except that the ammonia and ammonium salt components are made by mixing 40 grams of 29% aqueous ammonia, 32 grams of ammonium sulfamate and 50 parts of water.

The modified rosin soap component and the mixing procedure and amounts of Example 24 are repeated using these ammonia and ammonium salt components to yield a sizing agent.

EXAMPLE 27

This example is similar to Example 24, except that the first component is made by mixing 20 grams of 29% aqueous ammonia, 16 grams of ammonium sulfamate and 86 grams of water.

The modified rosin soap component and the mixing procedure and amounts of Example 24 are repeated using these ammonia and ammonium salt components to yield a sizing agent.

EXAMPLE 28

This example is similar to Example 24, except that the ammonia and ammonium salt components are made by mixing 40 grams of 29% aqueous ammonia, 16 grams of ammonium sulfate and 66 grams of water.

The modified rosin soap component and the mixing procedure and amounts of Example 24 are repeated using these ammonia and ammonium salt components to yield a sizing agent.

EXAMPLE 29

This example is similar to Example 24, except that the ammonia and ammonium salt components are made by mixing 5 grams of 29% aqueous ammonia, 4 grams of ammonium sulfamate and 113 grams of water are mixed at room temperature without heating.

The modified rosin soap component and the mixing procedure and amounts of Example 24 are repeated using these ammonia and ammonium salt components to yield a sizing agent.

EXAMPLE 30

The ammonia and ammonium salt components of this sizing agent are prepared as follows: 20 grams of 29% aqueous ammonia, 16 grams of ammonium sulfate and 86 grams of water are mixed at room temperature.

The modified rosin soap component and mixing procedure and amounts of Example 24 are repeated using these ammonia and ammonium salt components to yield a sizing agent.

EXAMPLE 31

In this example, the ammonia and ammonium salt components are made as follows 34 grams of 29% aqueous ammonia, 12.5 grams of glacial acetic acid and 76 grams of water are mixed together at room temperature without heating.

To form the sizing agent, 19 parts by weight of the ammonia and ammonium salt mixture are added to 23 parts by weight of the fumaric acid-modified rosin soap of Example 13 at room temperature and mixed without heating.

EXAMPLE 32

In this example, the reaction product of ammonia and the modified rosin soap is prepared as follows: 62 grams of 29% aqueous ammonia is mixed with 128 grams of water at room temperature.

To form the sizing agent, 19 parts by weight of the ammonia and water mixture are added to 23 parts by weight of the fumaric acid-modified rosin soap of Example 13 and boiled for three minutes to yield a sizing agent.

EXAMPLE 33

This example is similar to Example 32, except that the ammonia component is made by mixing 80 grams of 29% aqueous ammonia and 110 grams of water.

The modified rosin soap component and the mixing procedure and amounts of Example 32 are repeated, using this ammonia component to yield a sizing agent.

EXAMPLE 34

This example is similar to Example 32, except that the ammonia component is made by mixing 40 grams of 29% aqueous ammonia with 150 grams of water.

The modified rosin soap component and the mixing procedure and amounts of Example 32 are repeated, using this ammonia component to yield a sizing agent.

EXAMPLE 35

This example is similar to Example 32, except that the ammonia component is made by mixing 20 grams of 29% aqueous ammonia with 170 grams of water.

The modified rosin soap component and the mixing procedure and amounts of Example 34 are repeated, using this ammonia component to yield a sizing agent.

EXAMPLE 36

In this example, the reaction product of ammonia and modified rosin is prepared as follows: 115 grams of the fumaric-acid-modified rosin of Example 13 which has not been saponified and 155 grams of water are mixed with high speed agitation. 150 grams of 29% aqueous ammonia are added to the mixture. The mixture is then boiled for 3 minutes to yield a sizing agent.

It is claimed:

1. A sizing composition which comprises sizing effective amounts of a rosin that is modified with from about 5 to 50 percent, based on the weight of the rosin, of an organic acidic compound selected from the group consisting of an $\alpha, \beta$-unsaturated aliphatic acid containing from about 3 to 6 carbon atoms, an anhydride thereof, and their mixtures; ammonia in amounts sufficient to enhance the sizing characteristics of the composition; ammonium salt effective to, and in amounts sufficient to, enhance the sizing characteristics of the composition; and containing amounts of the modified rosin, ammonia and ammonium salt sufficient to provide the composition with a total acidity of at least about 1,000 parts per million.

2. The sizing composition of claim 1 wherein the rosin is modified with an organic acidic compound selected from the group consisting of maleic acid, maleic anhydride, fumaric acid, and their mixtures.

3. The sizing composition of claim 2 wherein the ammonium salt is the salt of an acid selected from the group consisting of sulfamic acid, phosphoric acid, oxalic acid, methane-sulfonic acid, trichloroacetic acid, nitric acid, sulfuric acid, hydrochloric acid, stearic acid and acetic acid.

4. The sizing composition of claim 3 prepared with from about 3 to 30 percent ammonia, from about 4 to 72 percent ammonium salt and from about 93 to 25 percent rosin and organic acidic compound, based on the total weight of the ammonia, the ammonium salt and the rosin and organic acidic compound on a dry basis, and using an ammonium salt to ammonia ratio greater than about 1 to 1.

5. The sizing composition of claim 4 wherein the rosin is modified with from about 9 to 30 percent of the organic acidic compound and is at least partially saponified; the ammonium salt is the reaction product of ammonia and the corresponding acid, and the composition is an aqueous mixture.

6. The sizing composition of claim 3 wherein the ammonia is provided by reaction between the rosin, the organic acidic compound, and the ammonium salt and the rosin is at least partially saponified.

7. The sizing composition of claim 6 prepared with from about 4 to 75 percent ammonium salt and from about 96 to 25 percent rosin and organic acidic compound, based on the total weight of the ammonium salt and the rosin and organic acidic compound on a dry basis.

8. The sizing composition of claim 7 wherein said rosin is modified with from about 9 to 30 percent of said organic acidic compound; the ammonium salt is the reaction product of ammonia and the corresponding acid; and the composition is an aqueous mixture.

9. The sizing composition of claim 2 wherein the ammonium salt is provided by reaction between the rosin, the organic acidic compound, and the ammonia.

10. The sizing composition of claim 9 prepared with from about 10 to 75 percent ammonia and from about 90 to 25 percent of rosin and organic acidic compound, based on the total weight of the ammonia and the rosin and organic acidic compound on a dry basis.

11. The sizing composition of claim 10 wherein the rosin is modified with from about 9 to 30 percent of the organic acidic compound and the composition is an aqueous mixture.

12. The sizing composition of claim 9 wherein the rosin is at least partially saponified.

13. The sizing composition of claim 12 containing from about 4 to 60 percent ammonia and from about 96 to 40 percent rosin and organic acidic compound, based on the total weight of the ammonia and the rosin and organic acidic compound on a dry basis.

14. The sizing composition of claim 13 wherein the rosin is modified with from about 9 to 30 percent of the organic acidic compound and the composition is an aqueous mixture.

15. A sizing composition comprising
a. the reaction product of urea and an acid selected from the group consisting of sulfamic acid, phosphoric acid, oxalic acid, methane-sulfonic acid, trichloroacetic acid, nitric acid, sulfuric acid, hydrochloric acid, stearic acid and acetic acid, wherein the acid has been reacted with the urea in an amount sufficient to produce a reaction product having a total acidity of at least about 1,000 parts per million, and sizing effective amounts of
b. a rosin that is modified with from about 5 to 50 percent, based on the weight of the rosin, of an organic acidic compound selected from the group consisting of an $\alpha$, $\beta$-unsaturated aliphatic acid containing from about 3 to 6 carbon atoms, an anhydride thereof, and their mixtures.

16. A sizing composition comprising
a. the reaction product of urea and an acid selected from the group consisting of sulfamic acid, phosphoric acid, oxalic acid, methane-sulfonic acid, trichloroacetic acid, nitric acid, sulfuric acid, hydrochloric acid, stearic acid and acetic acid, wherein the acid has been reacted with the urea in an amount sufficient to produce a reaction product having a total acidity of at least about 1,000 parts per million, and
b. a rosin that is modified with from about 5 to 50 percent, based on the weight of the rosin, of an organic acidic compound selected from the group consisting of an $\alpha$, $\beta$-unsaturated aliphatic acid containing from about 3 to 6 carbon atoms, an anhydride thereof, and their mixtures, said composition containing from about 25 to 85 percent, based on the total weight of the urea, the acid, the rosin, and the organic acidic compound, of component (a), and from about 75 to 15 percent of component (b).

17. The sizing composition of claim 16 wherein the rosin is modified with an organic acidic compound selected from the group consisting of maleic acid, maleic anhydride, fumaric acid, and their mixtures, and the urea is reacted with an acid selected from the group consisting of sulfamic acid, stearic acid, oxalic acid and acetic acid.

18. The sizing composition of claim 17 wherein said acid is sulfamic acid and the rosin is tall oil rosin and is at least partially saponified.

19. The sizing composition of claim 18 wherein said rosin is modified with from about 9 to 30 percent of said organic acidic compound.

20. The sizing composition of claim 18 wherein said sizing composition is an aqueous mixture.

21. The sizing composition of claim 18 wherein said rosin is modified with fumaric acid.

22. The sizing composition of claim 18 wherein said rosin is modified with maleic anhydride.

23. The sizing composition of claim 18 wherein said rosin is modified with maleic acid.

24. The sizing composition of claim 18 wherein said rosin is modified with a mixture of maleic anhydride and fumaric acid.

25. The sizing composition of claim 18 wherein said sizing composition contains from about 40 to 60 weight percent water, the rosin is saponified with sodium hydroxide and from about 0.2 to 8 weight percent sulfamic acid is reacted with the urea to produce a reaction product having an acidity of at least 4,000 parts per million.

26. The sizing composition of claim 25 wherein the organic acid is maleic anhydride.

27. The sizing composition of claim 25 wherein the organic acid is a mixture of maleic anhydride and fumaric acid.

28. A sizing composition comprising
a. the reaction product of urea, an acid selected from the group consisting of sulfamic acid, phosphoric acid, oxalic acid, methane-sulfonic acid, trichloroacetic acid, nitric acid, sulfuric acid, hydrochloric acid, stearic acid and acetic acid, and an ammonium salt, wherein the acid has been reacted with the urea and the ammonium salt in an amount sufficient to produce a reaction product having a total acidity of at least about 1000 parts per million, and sizing effective amounts of b. a rosin that is modified with from about 5 to 50 percent, based on the weight of the rosin, of an organic acidic compound selected from the group consisting of an $\alpha$, $\beta$ -unsaturated aliphatic acid containing from about 3 to 6 carbon atoms, an anhydride thereof, and their mixtures.

29. The sizing composition of claim 28 wherein the rosin is modified with an organic acidic compound selected from the group consisting of maleic acid, maleic anhydride, fumaric acid, and their mixtures, the ammonium salt is ammonium sulfate, and the urea is reacted with an acid selected from the group consisting of sulfamic acid, stearic acid, oxalic acid and acetic acid.

30. The sizing composition of claim 29 wherein the acid is sulfamic acid and the rosin is tall oil rosin and is at least partially saponified, the sizing composition is an aqueous mixture, the ratio of urea to ammonium sulfate ranges from about 2 to 1 to 1 to 4, and containing at least about 0.1 percent sulfamic acid, based on the urea.

31. The sizing composition of claim 30 wherein the rosin is modified with from about 9 to 30 percent of the organic acid compound.

32. A sizing composition comprising
a. an aqueous mixture of the reaction product of urea and an acid selected from the group consisting of sulfamic acid, phosphoric acid, oxalic acid, methane-sulfonic acid, trichloroacetic acid, nitric acid, sulfuric acid, hydrochloric acid, stearic acid, and acetic acid, wherein the acid has been reacted with the urea in an amount sufficient to produce a reaction product having a total acidity of at least about 1,000 parts per million; ammonium sulfate in a dry weight ratio to the reaction product of the urea and the acid of about 4 to 1 to 1 to 2; at least about 4 percent sodium borate based on the dry weight of the ammonium sulfate and the reaction product of the urea and the acid; and at least about 4 percent sulfamic acid based on the dry weight of the ammonium sulfate and the reaction product of the urea and the acid; and sizing effective amounts of b. a rosin that is modified with from about 5 to 50 percent, based on the weight of the rosin, of an organic acidic compound selected from the group consisting of an $\alpha$, $\beta$ -unsaturated aliphatic acid containing from about 3 to 6 carbon atoms, an anhydride thereof, and their mixtures.

33. The sizing composition of claim 32 containing from about 25 to 85 percent, based on the total dry weight, of component (a), and from about 75 percent to 15 percent of component (b).

34. The sizing composition of claim 33 wherein the rosin is modified with an organic acidic compound selected from the group consisting of maleic acid, maleic anhydride, fumaric acid and their mixtures, and the urea is reacted with an acid selected from the group consisting of sulfamic acid, stearic acid, oxalic acid and acetic acid.

35. The sizing composition of claim 34 wherein the acid is sulfamic acid and the rosin is tall oil rosin and is at least partially saponified.

36. The sizing composition of claim 35 wherein the rosin is modified with from about 9 to 30 percent of the organic acidic compound.

37. A method of making a sizing agent comprising
a. forming a modified rosin by modifying a rosin with from about 5 to 50 percent, based on the weight of the rosin, of an organic acidic compound selected from the group consisting of an $\alpha$, $\beta$ -unsaturated aliphatic acid containing from about 3 to 6 carbon atoms, an anhydride thereof, and their mixtures, at a temperature between about 212° F. and about 550° F., b. saponifying said modified rosin with sufficient amounts of aqueous ammonia to produce a mixture containing from about 10 to 75 percent ammonia and from about 90 to 25 percent rosin and organic acidic compound, based on the total weight of the ammonia and the rosin and organic acidic compound on a dry basis, and c. heating said mixture so that the pH of said mixture if about 8 to 10.

38. The method of claim 37 wherein the pH of the mixture is adjusted to a pH in the range of 9.2 to 9.8 and the rosin is tall oil rosin and is modified with an organic acidic compound selected from the group consisting of maleic acid, maleic anhydride, fumaric acid, and their mixtures.

39. The method of claim 38 wherein the rosin is modified with from about 9 to 30 percent of said organic acidic compound.

40. The method of claim 38 wherein the rosin is melted before it is modified with said organic acidic compound.

41. The method of claim 38 wherein the modified rosin is cooled to room temperature by dilution with water before it is saponified with the ammonia.

42. The method of claim 38 wherein the modified rosin is formed by modifying the rosin with the organic acidic compound in the presence of from about 0 to 10 percent water based on the total weight of the rosin, the organic acidic compound and the water.

43. The method of claim 38 wherein the rosin is fumaric modified at a temperature of about 420° F. to 440° F.

44. A method of making a sizing agent comprising
a. forming a modified rosin soap by modifying a rosin with from about 5 to 50 percent, based on the weight of the rosin, of an organic acidic compound selected from the group consisting of an $\alpha$, $\beta$ -unsaturated aliphatic acid containing from about 3 to 6 carbon atoms, an anhydride thereof, and their mixtures at a temperature between about 212° F. and 425° F., and forming a soap of the rosin, before, during, or after the modifying, b. mixing sufficient amounts of aqueous ammonia with the modified rosin soap to produce a mixture containing from about 4 to 60 percent ammonia and from about 96 to 40 percent rosin and organic acidic compound, based on the weight of the ammonia and the rosin and organic acidic compound on a dry basis, and c. heating the mixture so that the pH of the mixture is about 8 to 10.

45. The method of claim 44 wherein the pH of the mixture is adjusted to a pH in the range of about 9.2 to 9.8 and the rosin is tall oil rosin and is modified with an organic acidic compound selected from the group consisting of maleic acid, maleic anhydride, fumaric acid and their mixtures.

46. The method of claim 45 wherein the rosin is melted before it is modified with the organic acidic compound.

47. The method of claim 45 wherein the modified rosin is cooled to room temperature by dilution with water before it is mixed with the ammonia.

48. The method of claim 45 wherein the modified rosin is formed by modifying the rosin with the organic acidic compound in the presence of from about 0 to 10 percent water, based on the total weight of the rosin, the organic acidic compound and the water.

49. The method of claim 45 wherein the rosin is modified at a temperature of about 420° F. to 440° F.

50. A method of making a sizing agent comprising
 a. forming a first component by reacting urea and an acid selected from the group consisting of sulfamic acid, phosphoric acid, oxalic acid, methane-sulfonic acid, trichloroacetic acid, nitric acid, sulfuric acid, hydrochloric acid, stearic acid and acetic acid, said acid being reacted in an amount sufficient to produce a reaction product having a total acidity of at least about 1,000 parts per million, but a pH of at least 6.6, said acidity being measured as the amount of sodium hydroxide, expressed as the equivalent parts by weight of calcium carbonate, required to impart a pink color to a million parts of a phenolphthalein-containing, 50 weight percent aqueous mixture of the reaction product, and said pH being determined by a pH meter,
 b. forming a second component by modifying rosin with from about 5 to 50 percent, based on the weight of the rosin, of an organic acidic compound selected from the group consisting of an α, β -unsaturated aliphatic acid containing from about 3 to 6 carbon atoms, an anhydride thereof, and their mixtures, at a temperature between about 212° and 550° F., and forming a soap of said rosin before, during, or after said modifying, and
 c. mixing said first component and said second component in an amount sufficient to provide from about 25 to 85 percent, based on the total dry weight, of said first component reaction product and from about 75 to 15 percent of said second component soap of the modified rosin.

51. The method of claim 50 wherein said rosin is modified with an organic acidic compound selected from the group consisting of maleic acid, maleic anhydride, fumaric acid, and their mixtures and the urea is reacted with an acid selected from the group consisting of sulfamic acid, stearic acid, oxalic acid and acetic acid.

52. The method of claim 51 wherein said acid is sulfamic acid and said total acidity is at least about 4,000 parts per million.

53. The method of claim 51 wherein said soap is formed from said rosin by mixing said rosin with an aqueous solution of sodium hydroxide or potassium hydroxide.

54. The method of claim 51 wherein said rosin is modified with from about 9 to 30 percent of said organic acidic compound.

55. The method of claim 51 wherein said rosin is melted before it is modified with said organic acidic compound.

56. The method of claim 55 wherein said second component is cooled to room temperature by dilution with water before it is mixed with said first component.

57. The method of claim 51 wherein said first component is formed by reacting said urea and inorganic acid in the presence of from about 40 to 60 percent water, based on the total weight of the urea, the acid and the water.

58. The method of claim 51 wherein said second component is formed by modifying said rosin with said organic acidic compound in the presence of from 0 to 10 percent water, based on the total weight of the rosin, the organic acidic compound and the water.

59. The method of claim 51 wherein said first component and said second component are formed and mixed in a single step.

* * * * *